United States Patent
Jei

(10) Patent No.: US 7,158,495 B2
(45) Date of Patent: Jan. 2, 2007

(54) PACKET DATA TRANSMITTING/RECEIVING METHOD IN MOBILE COMMUNICATION SYSTEM

(75) Inventor: Dae-Gunn Jei, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1013 days.

(21) Appl. No.: 10/104,096

(22) Filed: Mar. 22, 2002

(65) Prior Publication Data

US 2002/0141359 A1 Oct. 3, 2002

(30) Foreign Application Priority Data

Apr. 3, 2001 (KR) ................. 2001-17623

(51) Int. Cl.
*H04Q 7/00* (2006.01)
(52) U.S. Cl. ................. 370/329; 455/450
(58) Field of Classification Search ............ None
See application file for complete search history.

(56) References Cited

U.S. PATENT DOCUMENTS

| | | | | |
|---|---|---|---|---|
| 6,031,832 A | | 2/2000 | Turina | 370/348 |
| 6,356,759 B1 * | | 3/2002 | Mustajarvi | 455/450 |
| 6,466,544 B1 * | | 10/2002 | Sen et al. | 370/231 |
| 6,501,745 B1 * | | 12/2002 | Turina et al. | 370/337 |
| 6,718,179 B1 * | | 4/2004 | Forssell et al. | 370/329 |
| 6,747,962 B1 * | | 6/2004 | Lintulampi et al. | 370/329 |
| 6,778,509 B1 * | | 8/2004 | Ravishankar et al. | 370/322 |
| 6,898,194 B1 * | | 5/2005 | Vedrine | 370/329 |
| 6,996,083 B1 * | | 2/2006 | Balachandran et al. | 370/337 |

2002/0082033 A1 * 6/2002 Lohtia et al. ............ 455/517

FOREIGN PATENT DOCUMENTS

EP 1005243 A1 * 5/2000
EP 1 021 017 A2 11/2000

OTHER PUBLICATIONS

Search Report dated Jul. 12, 2002 issued by the European Patent Office in Ep Appln. No. 02007575.0-2412.
Digital Cellular Telecommunication system (Phase 2+); General Packet Radio Service (GPRS); Mobile Station (MS)—Base Station (BSS) interface; Radio Link Control/Medium Access Control (RLC/MAC) protocol, GSM 04.60 Version 6.3.1 Release 1997, European Telecommunication Standard, Jun. 1999, pp. 1-185.
Turina et al., "A Proposal for Multi-Slot MAC Layer Operation for Packet Data Channel in GSM", Universal Personal Communications, 1996.

* cited by examiner

*Primary Examiner*—Chi Pham
*Assistant Examiner*—Anh-Vu Ly
(74) *Attorney, Agent, or Firm*—The Farrell Law Firm

(57) ABSTRACT

A method of transmitting/receiving packet data in a mobile communication system, where a mobile station requests a packet channel to a base station is disclosed. The base station checks whether the packet channel is available by monitoring the state of a radio link. If the packet channel is available, the base station transmits a Packet Uplink Assignment message including a UDSF (Uplink/Downlink State Flag) to the mobile station. The mobile station checks whether a downlink state flag is set by monitoring the UDSF of the Packet Uplink Assignment message. When the downlink state flag is set, the mobile station receives downlink packet data from the base station in a dedicated mode after the mobile station completely transmits uplink packet data.

4 Claims, 9 Drawing Sheets

PACKET DATA TRANSMITTING/RECEIVING METHOD IN MOBILE COMMUNICATION SYSTEM

PRIORITY

This application claims priority to an application entitled "Packet Data Transmitting/Receiving Method in Mobile Communication System" filed in the Korean Industrial Property Office on Apr. 3, 2001 and assigned Ser. No. 2001-17623, the contents of which are hereby incorporated by reference.

BACKGROUND OF THE INVENTION

1. Field of the Invention

The present invention relates generally to a data transmitting/receiving apparatus for a base station (BS) and a mobile station (MS), and in particular, to an apparatus and method for transmitting/receiving packet data between a BS and an MS.

2. Description of the Related Art

In general, a mobile communication system transmits/receives data in a predetermined frequency band to ensure mobility for users. The driving force behind the recent rapid development of mobile technology is the growing demands for data services such as wireless Internet browsing. Considering the unexpectedly soaring number of users in mobile communication systems, there is a need to explore a method of efficiently providing limited resources to multiple users in designing a mobile communication system.

A voice service-focusing mobile communication system requires minimization of time delay, whereas a data communication supporting system requires minimization of an error rate. In view of the characteristic of data communication, the existing circuit-switched protocol gives rise to an improved packet data protocol. Developmental work and standardization are under way to enable services using the packet data protocol to be available in existing mobile communication systems such as GSM (Global System for Mobile Communication), CDMA (Code Division Multiple Access), and DAMPS (Digital Advanced Mobile Phone System).

Concerning the European mobile communication system, GSM, it provides circuit-switched data services and connectivity to an external data communication network. The circuit-switched data services are used for packet-switched data communication as well as for circuit-switched data communication. GPRS (General Packet Radio Service) has been introduced into the GSM to render the packet-switched data communication efficient. The GPRS enables IP (Internet Protocol) communication or virtual circuit-switched communication. The GPRS supports a connectionless protocol like IP as well as a connection-oriented protocol like X.25. One of the advantages of the packet-switched data protocol is sharing one transmission resource among a plurality of users. In GSM, a time slot of the radio frequency carrier can be shared among a plurality of users during transmission/reception. The shared resources for uplink and downlink transmission are managed by a network, that is, a base station of a mobile communication system.

The major advantages of implementation of a packet data protocol in a mobile communication system are high rate data transmission and efficient use of frequency bands. The GPRS is, briefly saying, a "multi-slot operation" which allows one user to occupy one or more transmission resources.

FIG. 1 illustrates a GPRS network configuration according to the GPRS standards.

Referring to FIG. 1, packets input to an external X.25 network 122 and an external IP network 124 are transferred to a GPRS network through GGSNs (Gateway GPRS Support Nodes) 120. The packets are transmitted to SGSNs (Serving GPRS Support Nodes) 116 though a backbone network 118 by path selection in the GGSNs 120. Each SGSN 116 supports a service for the area where a GPRS terminal is located. The SGSN 116 transmits a GPRS packet destined for the terminal to a BSS (Base Station Subsystem) 110 for dedicated transmission. A GPRS register in an HLR (Home Location Register) 114 stores all GPRS service subscriber data. The subscriber data are exchanged between the SGSN 116 and an MSC (Mobile Switching Center) 112 to check service-related items such as limited roaming.

FIG. 2 illustrates the structure of transmission packet data. Referring to FIG. 2, packet transmission will be described below.

A packet from a GPRS network is mapped to at least one LLC (Logical Link Control) frame. The LLC frame has an information field, a frame header (FH), and a frame check sequence (FCS). This LLC frame is mapped to a plurality of RLC (Radio Link Control) data blocks. Each RLC data block includes a block header (BH), an information field, and a block check sequence (BCS). Here, "block" is the smallest transmission unit for a packet in the air interface. That is, an RLC data block is mapped to a radio block of a physical layer. L3H is the header of Layer 3 message.

Three medium access modes are supported in the RLC/MAC layer of GPRS: dynamic, extended dynamic, and fixed. The MS, in dynamic allocation, monitors its assigned USF (Uplink State Flag) on each PDCH (Packet Data Physical Channel) and transmits one or four radio blocks on the PDCH. The extended dynamic allocation is a simple extension of the dynamic one adapted to deliver large volume data. Within this mode, a USF value indicates assigned block periods on several PDCHs. In the case of the fixed allocation, a certain amount of assigned block periods are fixed. Handling with this mode does not involve monitoring of a USF value for a half duplex mode. A medium access mode available to the MS depends on MAC_MODE in a PACKET DOWNLINK ASSIGNMENT message received from the BS.

In the description of the present invention, a link and a channel directed from the BS to the MS are termed a "downlink" and a "downlink channel", and a link and a channel directed from the MS to the BS are termed an "uplink" and an "uplink channel".

The RLC BH has a USF for medium access on the uplink. FIG. 3 illustrates the structure of RLC/MAC data. The structure of RLC/MAC data block is defined and explained in GSM/GPRS specification. A radio block (also called and RLC/MAC block) consists of one MAC header, one control message contents or one data message contents. MAC header contains;

USF(Uplink state flag, 3 bits) This is used to identify users for Uplink transmission, or to characterize a PRACH.

Payload Type(2 bits) This identifies the type of block that follows (RLC data block or RLC/MAC control block).

S/P(Polling control, 3 bits) One Supplementary/Polling(S/P) bit to poll the mobile station (so that it sends an acknowledgement message) and two RRBP bits to tell the mobile station where to send the acknowledgement messages.

The USF of a packet data channel is used for multiplexing uplink radio blocks from a plurality of mobile users. The USF occupies three information bits and thus identifies eight ($2^3$) USF states. Uplink traffic is multiplexed according to the USF value. The USF is included in each radio block at the initial downlink transmission. Since the USF is set in all downlink radio, dynamic allocation is used. All MSs sharing a particular transmission resource monitor USFs on a downlink channel to check whether the uplink transmission resource is available. If its assigned USF indicates to an MS that uplink transmission is available, the MS transmits data in the next uplink radio block:

FIG. 4 is a timing diagram showing uplink transmission according to the USF of a downlink channel. Referring to FIG. 4, for USF=R1, MS1 is authorized to use four uplink bursts. Similarly, for USF=R2, MS2 is authorized to use four uplink bursts. For USF=F, an MS transmits an uplink PRACH (Packet Random Access Channel) to initiate uplink transmission. In the above manner, uplink transmission is carried out.

For uplink packet transmission, the MS transitions from a packet idle mode to a packet transfer mode and requests resource assignment to the BS by a Packet Channel Request message. The BS then determines whether resources are available by checking the state of radio resources. If the radio resources are available, the BS establishes a TBF (Temporary Block Flow) mode and transmits a Packet Uplink Assignment message to allow the MS to use one or more PDCHs. At the same time, the BS sets a USF value in a PDCH for identification of the resource-assigned MS. The MS sets a timer to TBF Starting Time set in the Packet Uplink Assignment message and uses a PDCH when the timer expires. This is the uplink contention resolution of GPRS.

The Packet Uplink Assignment message has a USF_GRANULARITY field. If USF_GRANULARITY is 0, one uplink radio block per USF is transmitted. If USF_GRANULARITY is 1, four uplink radio blocks per USF are transmitted. Then, the BS checks the radio block(s) received from the MS and transmits a Packet Uplink Ack/Nack message to the MS.

FIGS. 5 and 6 illustrate establishment of the uplink according to the standard specification GSM/GPRS 05.02 when USF_GRANULARITY is 0 and 1, respectively. UN is Unused downlink slot. The case with USF_GRANULARITY=1 exhibits better system performance than the case with USF_GRANULARITY=0.

It may occur that when the MS is about to complete packet data transmission, transmission data is generated in the BS. Such cases are quite common due to the bidirectionality of packet data communication.

In the above-described conventional technology, the MS transitions from the packet transfer mode to the packet idle mode after packet transmission. The MS then acquires system-related information from a PBCCH(Packet Broadcast Control Channel) and checks whether a Packet Paging Request message has been received by monitoring a PCCCH (Packet Common Control Channel). If the Packet Paging Request includes a paging message for the MS, the MS sets a dedicated mode by transmitting a Packet Paging Response message as defined in GSM 04.60 to the BS and receives data from the BS, which will be described in connection with FIG. 7.

FIG. 7 is a diagram illustrating a signal flow for establishing the uplink, transmitting uplink data, and then establishing the downlink according to the GSM standards.

Upon generation of data to be transmitted to the BS, the MS is released from the packet idle mode and transmits the Packet Channel Request message to the BS. If the BS determines that a packet channel is available by checking the radio links, it transmits the Packet Uplink Assignment message to the MS. As described referring to FIG. 5 or FIG. 6, the BS acknowledges packet uplink assignment by a USF. Then, the MS transmits packet data until there are no remaining packet data to be transmitted as indicated by the USF.

After the packet transmission is completed, if data to be transmitted to the MS is generated in the BS, the BS checks a PBCCH and pages the MS by the Packet Paging Request message. Upon receipt of the paging signal in the packet idle mode, the MS transmits the PACKET PAGING RESPONSE signal to the BS. Thus, a dedicated mode is established between the BS and the MS and downlink data transmission is carried out.

If transmission data for the MS is generated at the end of packet transmission from the MS, the BS has no way to notify the MS that it has transmission data for the MS. Therefore, the dedicated mode is not set until the MS transitions from the packet transfer mode to the packet idle mode and then receives the Packet Paging Request message paging the MS from the BS.

In other words, after releasing the established radio resource (RR) connection between the BS and the MS, the BS sets a new TBF mode, pages the MS and transmits data to the MS an inefficient use of resources and time.

SUMMARY OF THE INVENTION

It is, therefore, an object of the present invention to provide a method of notifying a MS of the need to establish a downlink channel before an uplink channel is released during the period when the uplink is established in a GSM mobile communication system.

It is another object of the present invention to provide a method of simplifying a call set-up process between a BS and an MS in a GSM mobile communication system.

It is a further object of the present invention to provide a method of reducing power consumption for a BS and an MS in a GSM mobile communication system.

The foregoing and other objects of the present invention are achieved by providing a method of transmitting/receiving packet data in a mobile communication system. According to the present invention a mobile station requests a packet channel to a base station. The base station checks whether the packet channel is available by monitoring the state of a radio link. If the packet channel is available, the base station transmits a Packet Uplink Assignment message including a UDSF (Uplink/Downlink State Flag) to the mobile station. The mobile station checks whether a downlink state flag is present by monitoring the UDSF of the Packet Uplink Assignment message. When the downlink state flag is present, the mobile station receives downlink packet data from the base station in a dedicated mode after the mobile station completely transmits uplink packet data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Only uplink packet transmission in dynamic allocation medium access is considered to simplify a description of packet data transmission between a BS and an MS in a packet data transmission system. Specifically, a description will be made of the case that the BS has transmission data during uplink transmission.

Figure 1:
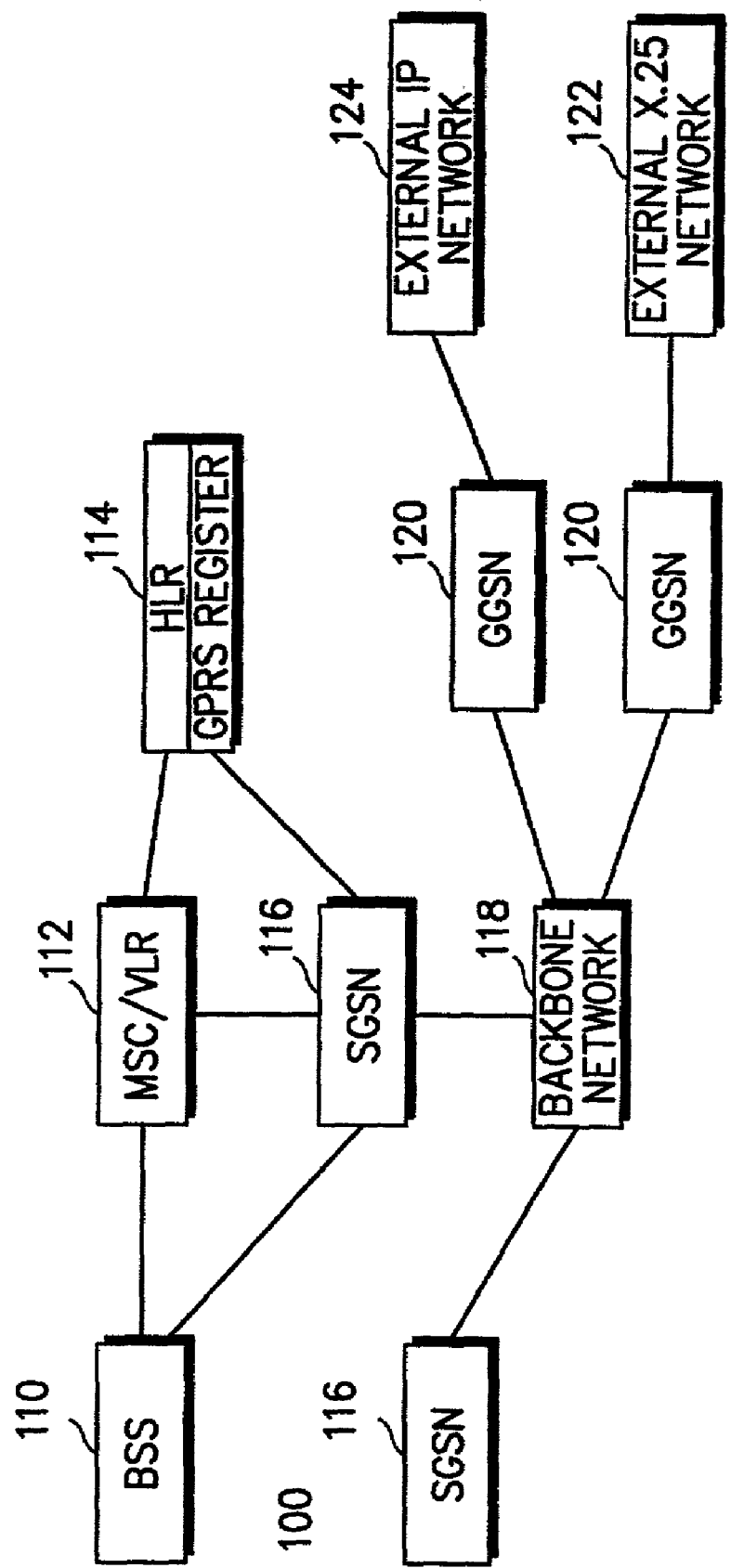
FIG. 1 illustrates a GPRS network configuration according to the GPRS standards.
Figure 2:
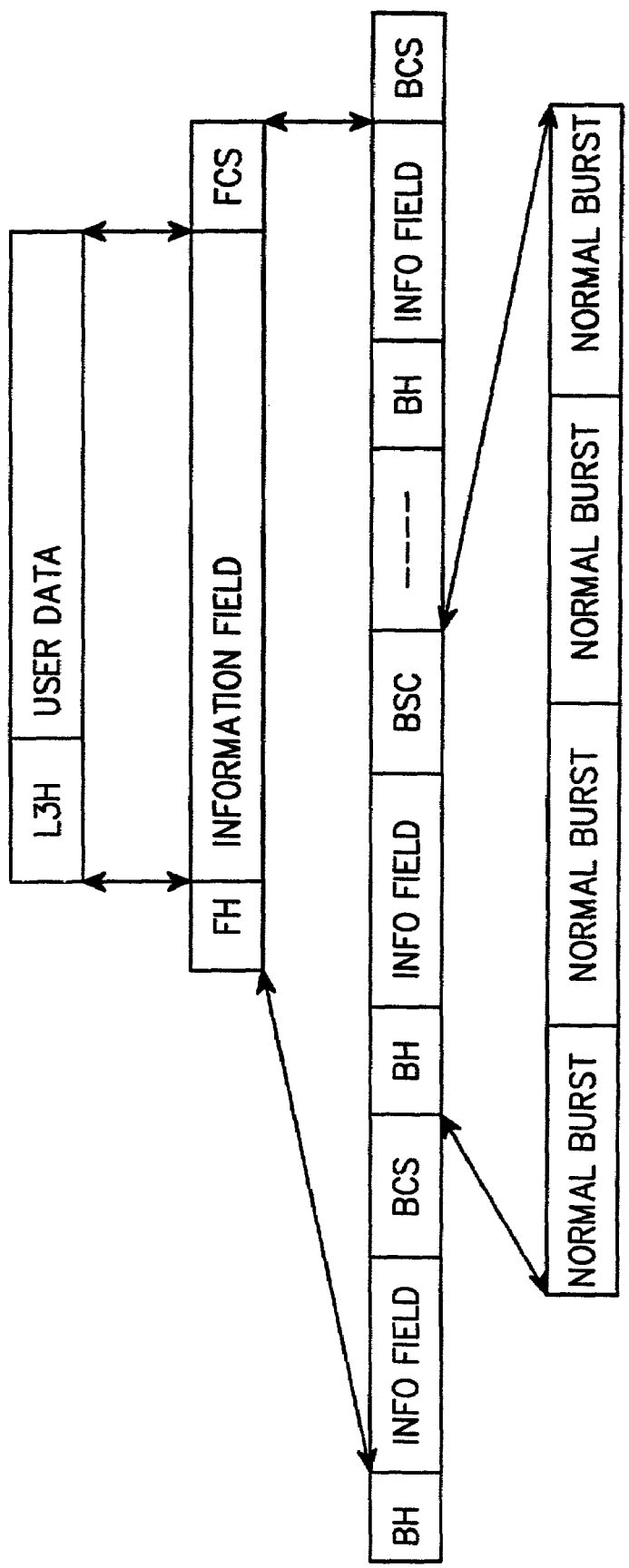
FIG. 2 illustrates the structure of packet data.
Figure 3:
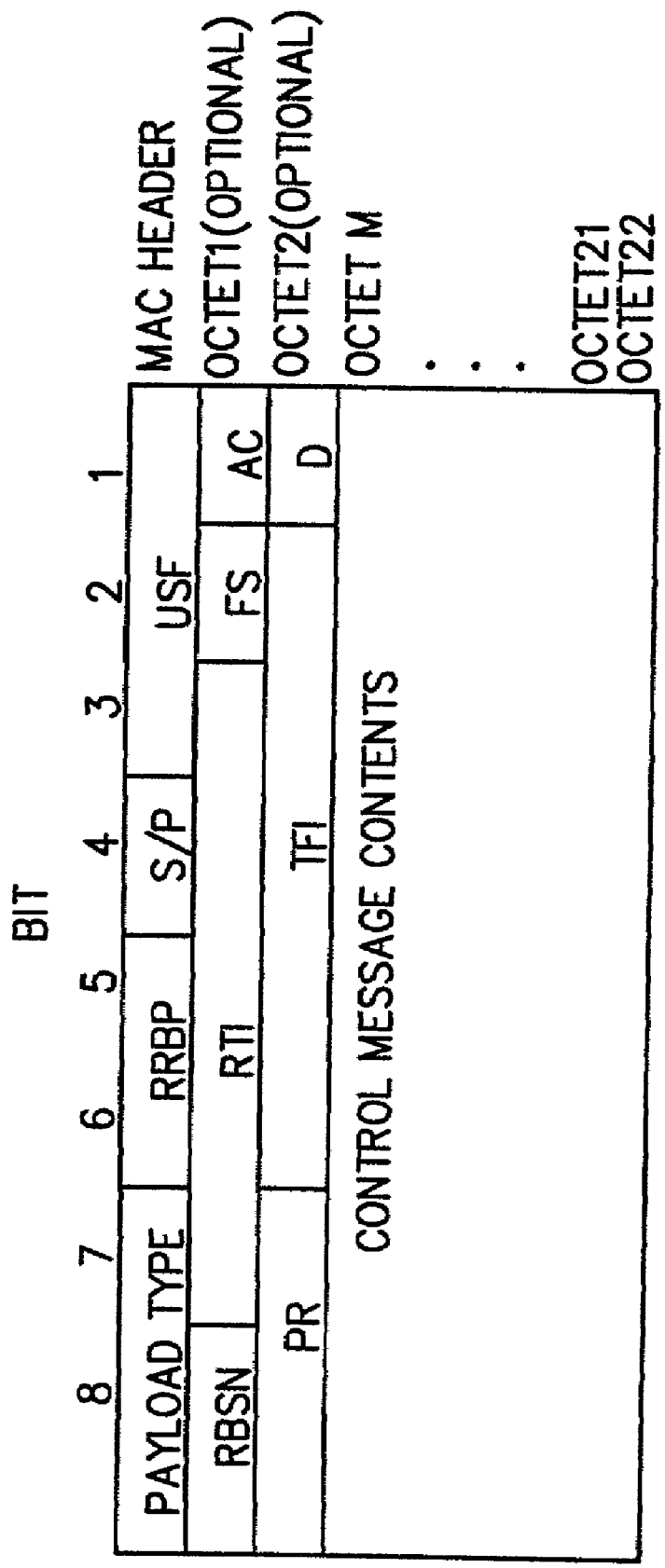
FIG. 3 illustrates the structure of RLC/MAC data.
Figure 4:
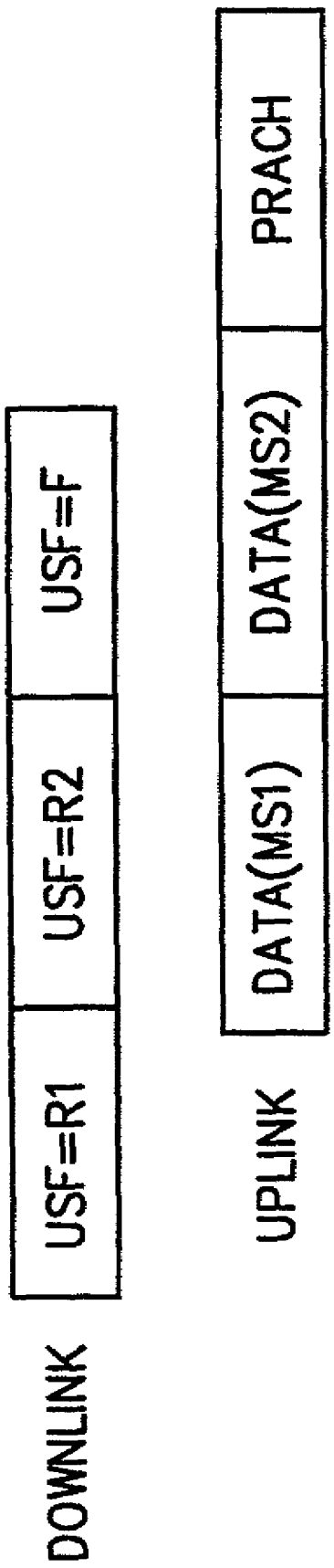
FIG. 4 is a timing diagram showing uplink data transmission according to a USF value set in a downlink message.
Figure 5:
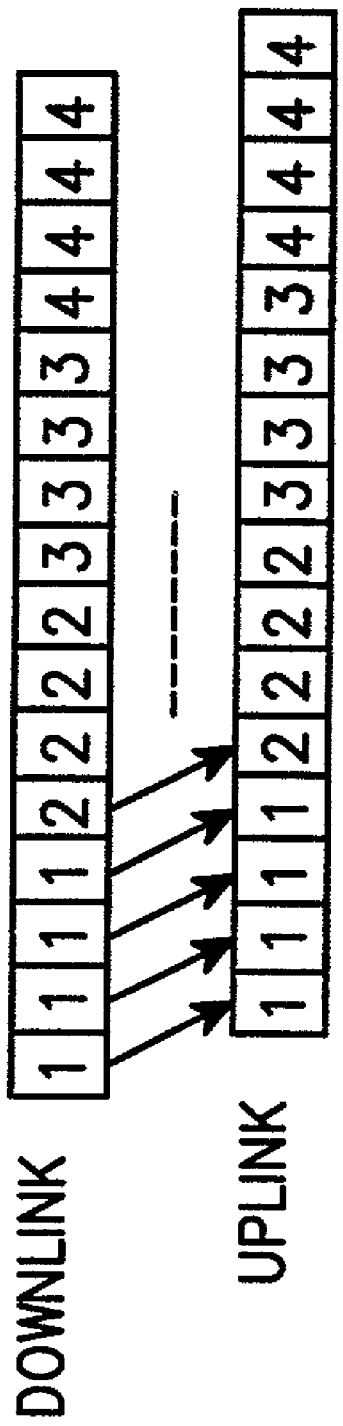
FIGS. 5 and 6 illustrate establishment of the uplink according USF_GRANULARITY.
Figure 6:
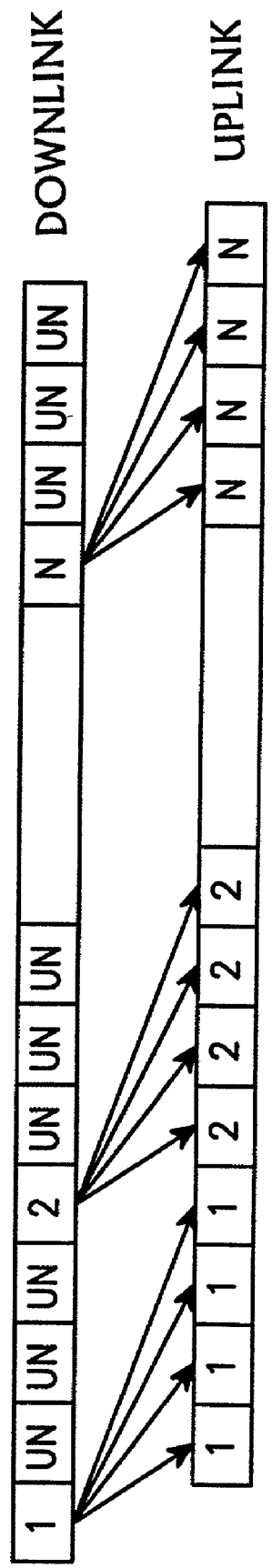
Figure 7:
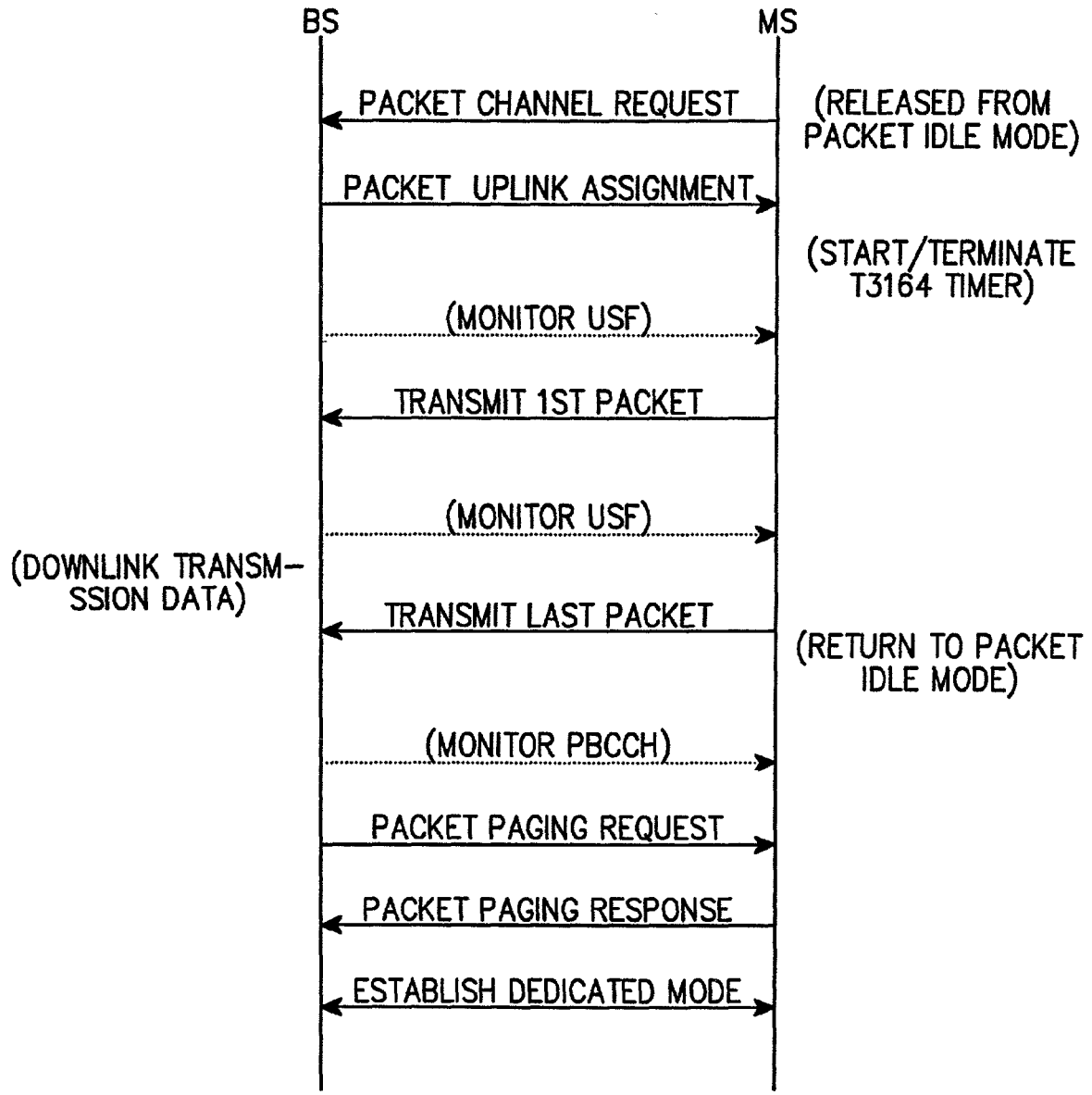
FIG. 7 is a diagram illustrating a signal flow for establishing the uplink, transmitting uplink data, and then establishing the downlink according to the GSM standards.
Figure 8:
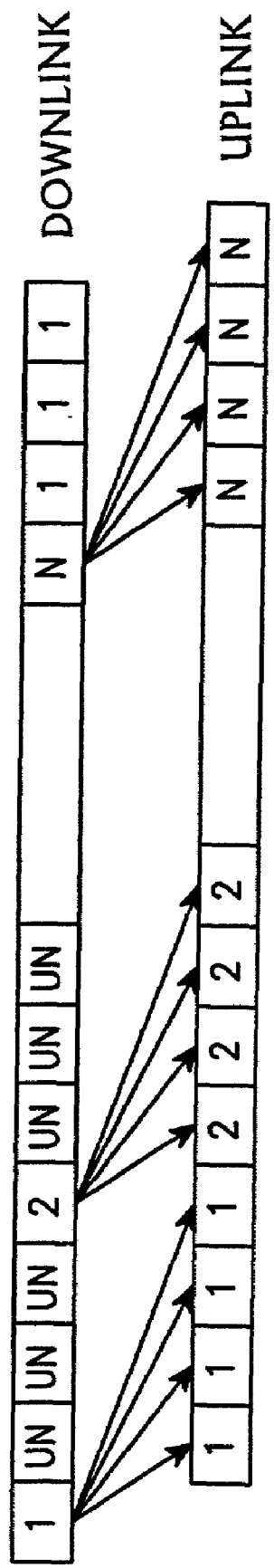
FIG. 8 is a timing diagram in the case where a UDSF (Uplink and Downlink State Flag) is used according to an embodiment of the present invention.

FIG. 8 is a timing diagram in the case where a USDF (Uplink and Downlink State Flag) is used according to the present invention.

A BS transmits a flag with USF_GRANULARITY=1 for uplink packet data transmission to an MS. The BS allows uplink packet data transmission using the first one of four slots assigned to the MS and uses one of the other three slots as a downlink state flag. A BS can set various priority levels of downlink data using all three bits or two bits.

Therefore, if the BS allows a first mobile station MS1 uplink transmission and has no transmission data directed to MS1, the BS inserts 1 in the first slot and no data in the second through fourth slots. If the BS allows an Nth MS uplink transmission and has transmission data directed to the Nth MS, the BS inserts data indicating the presence of the downlink data using one of the second through fourth slots, or all three slots. When the three slots are all used, the priority of the downlink data can be expressed. For three bits, $2^3$ priority levels of downlink data can be expressed.

Figure 9:
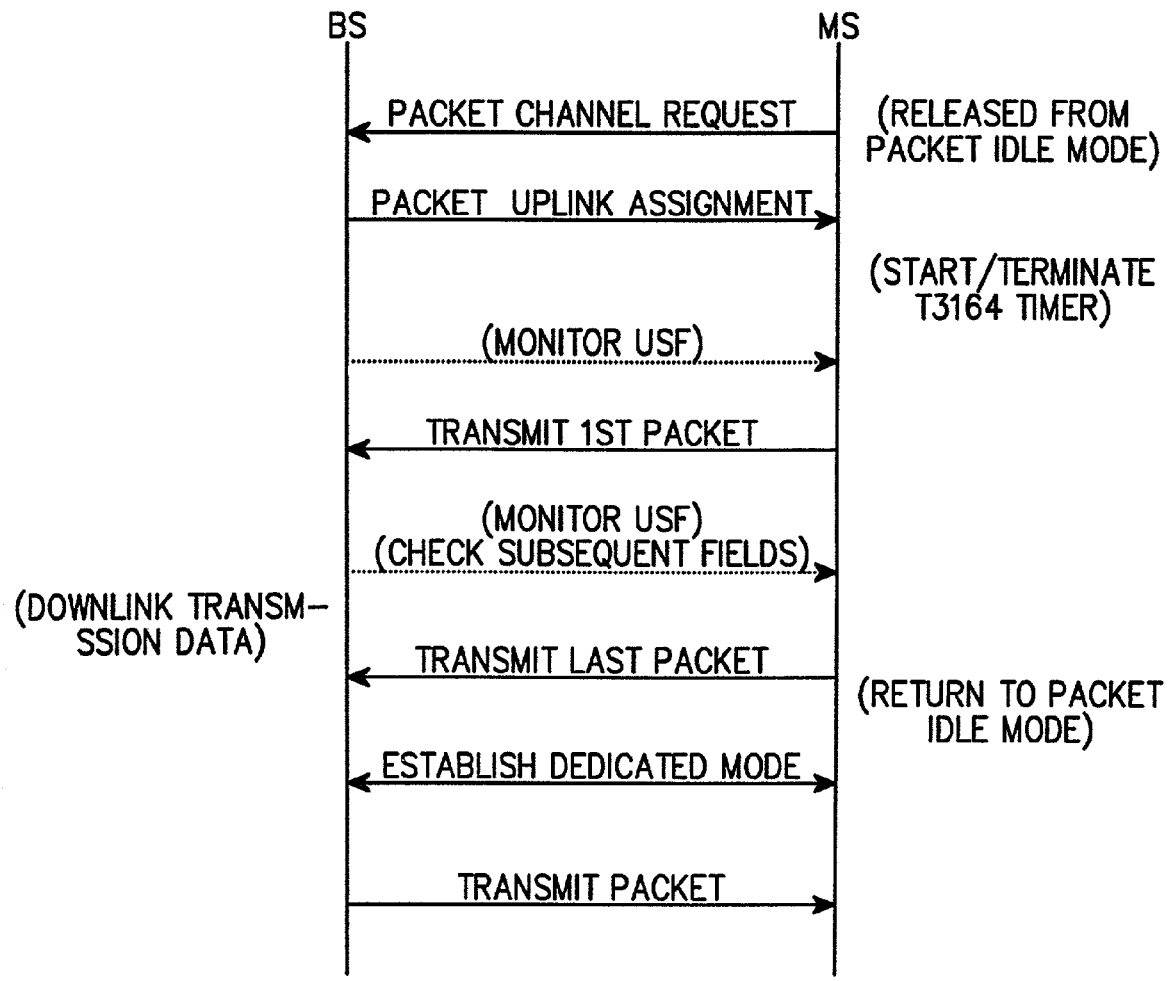
FIG. 9 is a diagram illustrating a signal flow for establishing the uplink and the downlink between a BS and an MS according to an embodiment of the present invention.

FIG. 9 is a diagram showing a signal flow for establishment of a downlink channel and an uplink channel between a BS and an MS according to an embodiment of the present invention. Channel establishment between the BS and the MS will be described below referring to FIGS. 8 and 9.

Upon generation of uplink transmission data, the MS transitions from the packet idle mode to the packet transfer mode and transmits a Packet Channel Request message to the BS. The BS then determines whether a packet channel is available by checking the radio link and if it is, the BS transmits a Packet Uplink Assignment message to the MS. At the same time, the BS allows assignment of the packet channel using a UDSF as described referring to FIG. 8. That is, when packet channel assignment is done, the BS transmits a message with USF_GRANULARITY=1 in the first of four slots assigned to the MS. The MS then performs uplink packet transmission in the assigned four slots.

The packet data transmission can be considered in two ways when the UDSF is one bit.

(1) In the case where the MS is capable of continuing packet transmission, the packet transmission lasts until there is no remaining transmission data as long as the BS allows the MS uplink channel assignment. In this case, the UDSF signal uses one bit. In other words, when the priority level of downlink data is not notified, the MS carries out the uplink transmission without interruption. If the MS recognizes a downlink state flag by monitoring a UDSF during the uplink transmission, the MS establishes a dedicated mode for downlink transmission without transitioning to the packet idle state.

(2) In the case where the UDSF occupies at least two bits, the downlink state flag can be set to represent at least four different classes. If the UDSF represents the highest priority level of downlink data, downlink transmission can take precedence over uplink transmission. In this case, the MS discontinues its uplink transmission and establishes a dedicated mode for the downlink transmission. After receiving all downlink data, the MS resumes the uplink transmission.

Even if the UDSF occupies two bits, the above method can be employed. That is, the first and second slots can be used: the first slot for USF_GRANULARITY=1 and the second slot for the priority level of data. It can be assumed that if the second bit is 1, the data is high in priority level and if the second bit is 0, the data is moderate in priority level. In this case, upon generation of downlink transmission date, the data can be transmitted in the third slot only or the third and fourth slots.

In this manner, data of a higher priority can be processed above all. If data is of the same priority level, the data is processed after the existing data is completely processed.

Returning to FIG. 9, the case that the UDSF uses one bit will be described.

Upon receipt of a Packet Uplink Assignment message from the BS, the MS sets a timer to TBF Starting Time set in the received message. When the timer expires, the MS can use a PDCH, which is the uplink contention resolution in GPRS.

Then, the MS transmits packet data to the BS according to the message which is assumed herein to have USF_GRANULARITY=1, until the uplink packet transmission is completed as long as the BS allows the uplink transmission. If the MS recognizes the existence of downlink transmission data by monitoring the UDSF, the MS sets a dedicated mode with the BS after transmission of the last data.

After finishing the uplink transmission, the MS can receive the downlink data directly without transitioning from the packet transfer mode to the packet idle mode. In other words, since an RR connection has already been established and a TBF mode is set, the MS can receive the data without passing through the contention resolution procedure.

As described above, the present invention advantageously manages resources efficiently since it is possible to recognize the existence of transmission data during packet data transmission between a BS and an MS in a GSM mobile communication system. As a result, power consumption between the BS and the MS is reduced and a signal flow between them is simplified.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting and receiving packet data between a base station and a mobile station in a mobile communication system using an uplink/downlink state flag (UDSF), comprising the steps of:
   requesting a packet channel from the mobile station to the base station;
   determining if the packet channel is available by monitoring the state of a radio link in the base station, and transmitting a Packet Uplink Assignment message including the UDSF from the base station to the mobile station if the packet channel is available; and
   monitoring by the mobile station the UDSF of the Packet Uplink Assignment message to determine if a downlink state flag is set, and if the downlink state flag is set, releasing a packet idle mode and directly setting a dedicated mode in the packet idle mode-released state after completely transmitting uplink packet data, and transmitting downlink packet data using the base station and the dedicated mode.

2. A method of transmitting and receiving packet data in a mobile station of a mobile communication system using an uplink/downlink state flag (UDSF), comprising the steps of:
   monitoring the UDSF during transmission of uplink packet data to determine if a downlink state flag having a preset priority level is set;
   comparing priority levels of the downlink state flag and an uplink state flag having a preset priority level if the downlink state flag is set;
   discontinuing the uplink transmission and receiving downlink packet data from a base station in a dedicated mode, if the priority level of the uplink packet data is less than the priority level of the downlink packet data;
   resuming the uplink transmission upon receipt of the last downlink packet data packet if uplink transmission data exists;
   continuing the uplink transmission if the priority level of the uplink packet data is greater than or equal to the priority level of the downlink packet data; and
   receiving the downlink packet data in a dedicated mode when the uplink transmission is completed.

3. A method of transmitting and receiving packet data in a base station of a mobile communication system using an uplink/downlink state flag (UDSF), comprising the steps of:
   determining if downlink data is generated during the receiving of uplink packet data from mobile station;
   transmitting the UDSF with a downlink state flag set to a predetermined priority level to the mobile station if the downlink transmission packet data is generated;
   transmitting the downlink packet data in a dedicated mode upon request of downlink transmission from the mobile station;
   resuming uplink reception when downlink transmission is completed;
   storing the downlink packet data until the last uplink packet is received if the mobile station resumes the uplink packet transmission; and
   transmitting the downlink packet data in the dedicated mode if the uplink reception is completed.

4. A method of transmitting and receiving packet data between a base station and a mobile station in a mobile communication system using an uplink/downlink state flag (UDSF), comprising the steps of:
   requesting a packet channel to the base station by the mobile station;
   determining if the packet channel is available by monitoring the state of a radio link in the base station and transmitting a Packet Uplink Assignment message including the UDSF from the base station to the mobile station if the packet channel is available;
   monitoring by the mobile station the UDSF of the Packet Uplink Assignment message to determine if a downlink state flag is set, and comparing by the mobile station a preset priority level of an up link packet and preset priority level of a downlink packet when the downlink state flag is set;
   receiving the downlink packet data in a dedicated mode after transmitting the uplink packet data if the priority level of the uplink packet data is greater than or equal to the priority level of the downlink packet data;
   discontinuing the uplink transmission and receiving the downlink packet data in the dedicated mode if the priority level of the uplink packet data is less than the priority level of the downlink packet data; and
   resuming the uplink transmission when the downlink transmission is completed.

* * * * *